Figure 1:
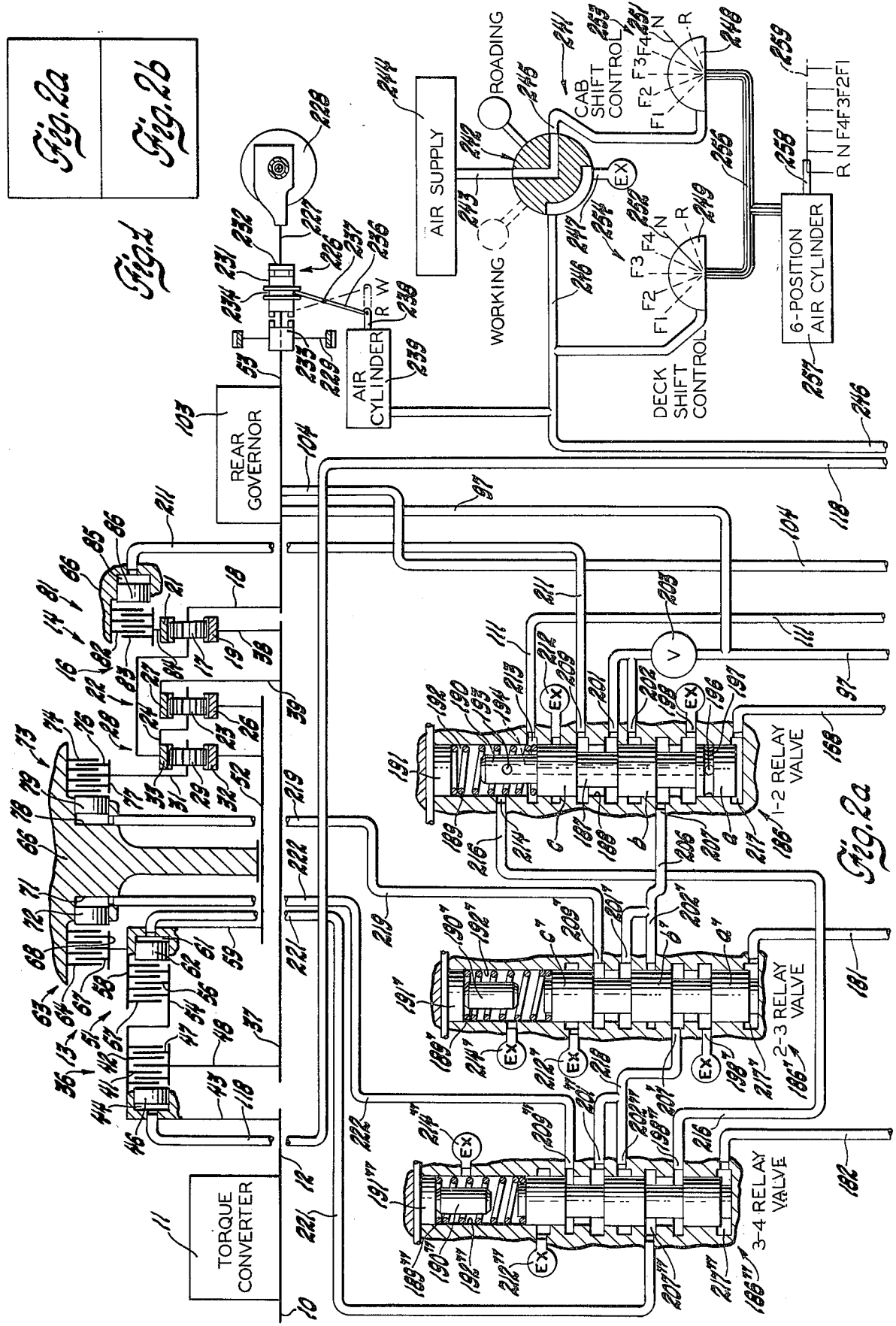

United States Patent [19]

Harmon et al.

[11] 4,111,072

[45] Sep. 5, 1978

[54] TRANSMISSION WITH AUTOMATIC AND MANUAL CONTROL MODES

[75] Inventors: Kenneth B. Harmon, Indianapolis; Richard J. Koenig, Carmel; Carl A. Lentz, Mooresville, all of Ind.

[73] Assignee: General Motors Corporation, Detroit, Mich.

[21] Appl. No.: 795,129

[22] Filed: May 9, 1977

[51] Int. Cl.² .............................................. B60K 21/04
[52] U.S. Cl. ........................................ 74/864; 74/867
[58] Field of Search ................ 74/863, 864, 868, 867, 74/869, 731; 192/109 F

[56] References Cited

U.S. PATENT DOCUMENTS

| 3,255,642 | 6/1966 | Christenson et al. | 74/869 X |
| 3,691,872 | 9/1972 | Schaefer et al. | 74/864 |

Primary Examiner—Samuel Scott
Assistant Examiner—Frank H. McKenzie, Jr.
Attorney, Agent, or Firm—A. M. Heiter

[57] ABSTRACT

A multiratio powershift transmission with a shift control system having a manually selected roading phase and a working phase. The roading phase for vehicle drive permits manual selection of a normal automatic shift control mode providing automatic shifting between ratio drives in response to output speed and throttle for maintaining the engine driven input in a normal speed range for optimum economy at part throttle and optimum performance at full throttle, and a hold automatic shift control mode providing a manually selected ratio drive with hold automatic upshifts and normal automatic downshifts and inhibiting manual hold downshifts between ratio drives in response to output speed to limit engine driven input speed to a maximum speed range during overrun drive. The working phase for driving a works, such as a derrick, permits manual selection of the ratio drives to provide progressive output speed control in response to throttle, and provides hold upshifts and inhibited manual downshifts to limit engine speed to a maximum speed range.

7 Claims, 4 Drawing Figures

TRANSMISSION WITH AUTOMATIC AND MANUAL CONTROL MODES

This invention relates to transmissions and controls therefor, and particularly to transmissions with controls for the manual selection of ratio drives and operation of the selected ratio drives over different automatically limited speed ranges.

This invention provides, in a multiratio transmission and control system, two manual selection modes of operation permitting manual selection of individual ratio drives and operative to provide the selected ratio drive in the hold mode in small increasing output speed ranges having both the minimum and maximum speed increasing with increasing speed ratio and, in the manual mode, in larger increasing output speed ranges having the same minimum speed and increasing maximum speed with increasing speed ratio.

In the hold mode, speed responsive automatic shifting is provided between the selected ratio drive and lower ratio drives.

This invention provides, in a multiratio transmission, the manual mode of operation permitting manual selection of the ratio drives and operation in the selected ratio drive over the full drive operation output speed range from a minimum drive speed to a maximum drive speed, so that during drive operation the transmission operates only in the selected ratio drive without automatic shifting and output speed progressively varies with engine throttle.

During overrun operation, when the load drives the output and, through the transmission ratio drive, causes the input and engine to rotate at maximum engine speed, there is, in both hold mode and manual mode operation, an automatic hold upshift to a higher ratio drive to reduce engine speed to a value less than the maximum engine speed. Also, in both hold mode and manual mode operation, a manual downshift at an output speed which would cause the input, due to overrun operation, to be driven at a speed above maximum engine speed is inhibited to prevent the ratio downshift until output speed decreases to a proper value so engine speed is not increased above maximum engine speed.

In the preferred arrangement of the multiratio transmission and controls, a disconnect clutch selectively connects the transmission output, in a roading phase to drive a vehicle, or in a working phase to drive a works, such as a derrick. In the roading phase, the transmission controls provide for manual selection of an automatic mode or a hold mode of operation. In the automatic mode, automatic shift valves, controlled in response to output speed and torque demand, provide automatic upshifts at increasing speeds with increasing torque demand and downshifts at lower speeds for vehicle drive operation in the full vehicle drive speed range with the input speed in the normal engine driving speed range for maximum economy at part throttle and maximum performance at full throttle. In the hold mode, the controls provide for manual selection of each ratio drive to hold the transmission in the selected ratio drive to a higher hold upshift speed above the automatic upshift speed of the selected ratio drive, but providing upshifting at the hold upshift speed to higher ratio drives to prevent overrun drive of the input above maximum engine speed to provide maximum engine braking during vehicle overrun drive. Automatic shifts occur between the selected hold ratio drive, and any lower ratio drives for manual control of the top ratio for maximum performance drive. Manual hold downshifts are inhibited above an inhibit shift speed to prevent ratio downshifts when overrun drive output speed would increase input speed above maximum engine speed. When a downshift would not increase input speed above maximum engine speed, manual hold downshifts are permitted at the inhibit shift speed. In the automatic and hold modes, the output governor provides, preferably by output governor pressure, an upshift direction bias force on the shift valves proportional to output speed. In the automatic mode, the downshift direction bias force on the shift valves is proportional to torque demand. In the hold mode, the downshift direction bias force on each shift valve is constant.

In the working phase, a manual mode is provided in which manual selection of each ratio drive provides hold mode operation of the shift valves in the selected ratio drive and prevents automatic downshifting to ratio drives below the selected ratio drive. In the manual mode, as progressively higher ratio drives are selected, a progressively higher upshift force, each greater than the upshift force required for an automatic upshift in the automatic mode for upshift to the selected ratio drive, is provided to provide an upshift to, and continuous drive in, the selected ratio in the full drive speed range with absolute control of output speed by engine throttle control. When the output speed governor bias force increases above the manual mode constant bias force in each ratio drive, the governor bias force acts on the shift valves. As the governor bias force increases with increasing output speed, hold upshifts to higher speed ratios are made to maintain input speed within the maximum engine speed range. During manual mode operation in higher ratios, a manual mode downshift will be inhibited in the same manner as during hold mode operation to prevent downshifts at high speeds which would increase input speed above the maximum engine speed and, at lower speeds, to permit manual mode downshifts when input speed would not increase above maximum engine speed.

Figure 2:
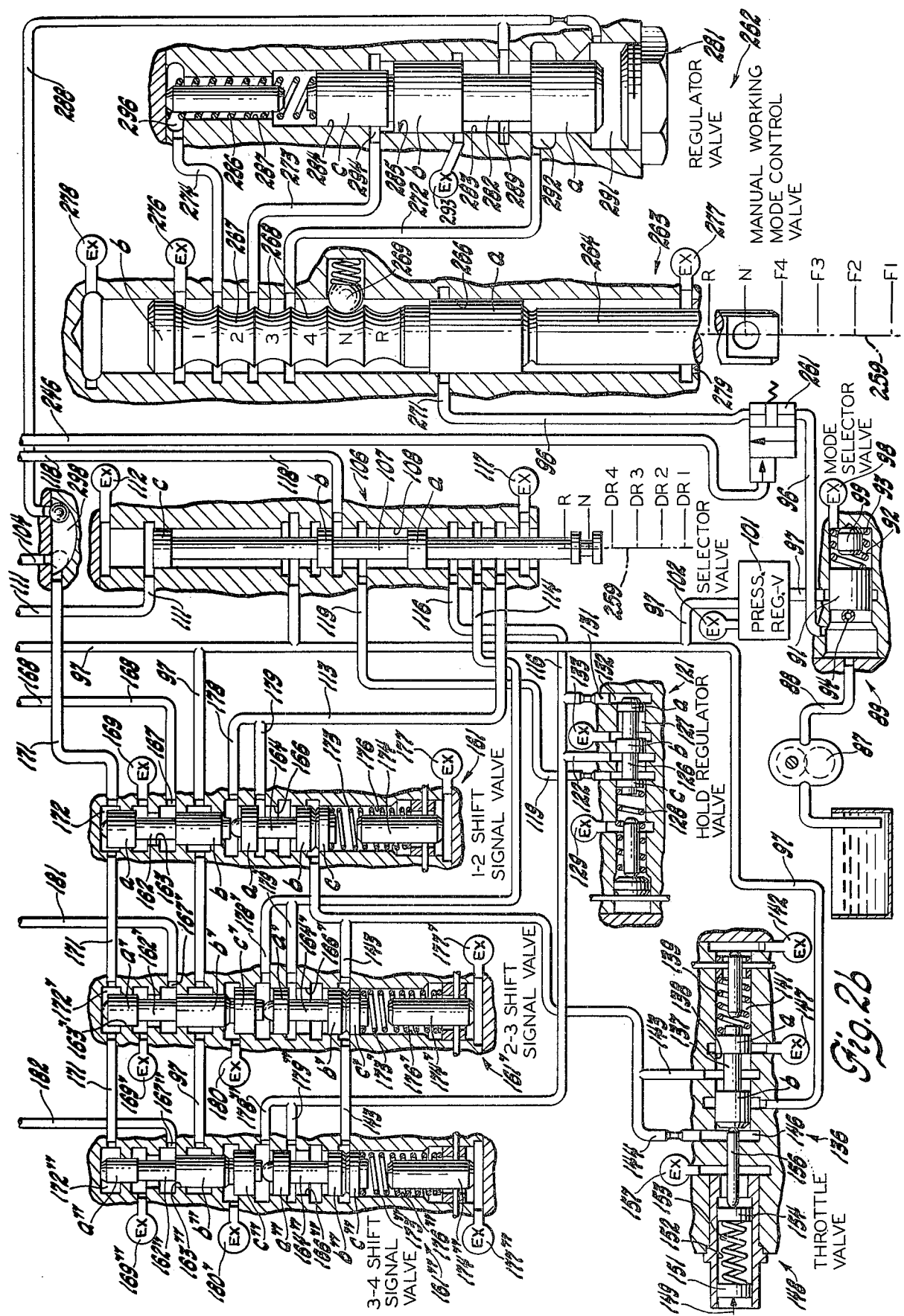
Figure 3:
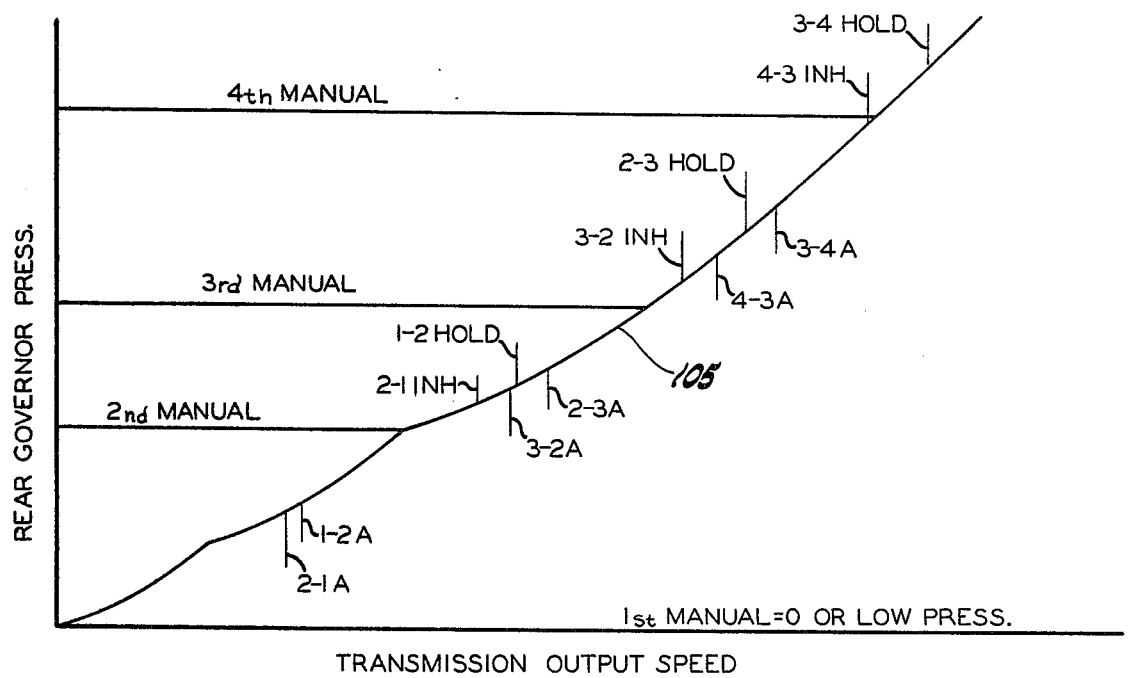

These and other features of the invention are more fully explained in the following description and accompanying drawings, wherein:

FIG. 1 shows the arrangement of combined FIGS. 2a and 2b;

FIGS. 2a and 2b, when combined as shown in FIG. 1, diagrammatically show a transmission and automatic shift control system with the roading and working phase selector control; and FIG. 3 is a plot of governor pressure relative to output speed to show the roading phase automatic and hold shift operations and the working phase shift operation.

In this description of the invention, an automatic transmission having a roading phase automatic shift control system and a working phase manual selection shift control having the essential features for employing this invention, is described. For further details of the conventional torque converter, powershift gearing, and automatic output speed and torque demand responsive shift controls, reference may be made to U.S. Pat. No. 3,691,872 granted to Robert H. Schaefer and Joseph R. Fox, on Sept. 19, 1972.

Referring to the drawing, FIG. 2a shows the power train having an input shaft 10 driving a conventional rotary torque converter 11 which may include a lock-up clutch connected in parallel to drive intermediate or gear transmission input shaft 12 of powershift transmission 13.

The powershift transmission 13 has a 4-speed gear unit 14 having three planetary gearsets. The first or rear gearset 16 has planetary pinions 17 mounted on a carrier 18 and meshing with sun gear 19 and ring gear 21. The second gearset 22 has pinions 23 rotatably mounted on carrier 24 and meshing with sun gear 26 and ring gear 27. The third gearset 28 has planetary pinions 29 mounted on carrier 31 and meshing with sun gear 32 and ring gear 33.

The forward clutch 36 is engaged in all forward ratio drives and connects the intermediate shaft 12 to drive the gear unit primary input shaft 37 which drives, through hub 38, sun gear 19 of first gearset 16 and through hub 39, ring gear 27 of second gearset 22. The forward clutch 36 has input plates 41 mounted on input drum 42 driven by rotary hub 43 drive connected to shaft 12. Hub 43 has a cylinder 44 formed therein for piston 46. On the supply of fluid by drive 4 line 118 to cylinder 44, piston 46 engages input plates 41 and output plates 47 which are connected by a hub 48 to drive gear unit primary input shaft 37. Fourth speed clutch 51 connects intermediate shaft 12 to secondary input shaft 52 which drives sun gears 26 and 32 of respective second and third gearsets 22 and 28, and with the above forward clutch drive locks the gearing for 1:1 drive from carrier 24, ring gear 33, and carrier 18 to output shaft 53. Fourth speed clutch 51 is also engaged in reverse drive. The 4th speed clutch 51 has an input drum 54 formed as a continuation of input drum 42 and is thus driven by intermediate shaft 12 and drives input plates 56. Output plates 57 are connected by output drum 58 and hub 59 to secondary input shaft 52. Hub 59 has a cylinder 61 formed therein for piston 62 and, on the supply of fluid by 4th clutch apply line 221, piston 62 engages plates 56 and 57 to effect a drive from intermediate shaft 12 to secondary input shaft 52 to drive sun gears 26 and 32. Shaft 52 may also be held by 3rd speed brake 63, which has fixed plates 64 grounded to transmission housing 66, and rotary plates 67 drive connected through drum 68 and hub 59 to secondary input shaft 52 to hold shaft 52. When fluid is supplied by 3rd brake apply line 222 to cylinder 71 formed in transmission housing 66 to move piston 72 to engage plates 64 and 67, 3rd brake 63 is engaged to hold secondary input shaft 52 and sun gears 26 and 32 for 3rd speed drive. The 2nd speed brake 73 has a plurality of fixed plates 74 secured to housing 66 and rotary plates 76 connected by drum 77 to carrier 31 of third gearset 28. When fluid is supplied by 2nd brake apply line 219 to cylinder 78 formed in housing 66, piston 79 moves to engage plates 74 and 76 and holds carrier 31 for 2nd speed drive. The 1st speed and reverse brake 81 has a plurality of fixed plates 82 secured to housing 66 and rotary plates 83 drive connected by drum hub 84 to ring gear 21 of first gearset 16. When fluid is supplied by 1st speed and reverse brake apply line 211 to cylinder 85 formed in housing 66 to move piston 86 and engage plates 82 and 83, ring gear 21 of first gearset 16 is held for 1st speed drive.

CONTROLS

The brakes and clutches are engaged, as indicated by "X" in the following chart, and the other disengaged, to provide Neutral (N), four forward speeds (1, 2, 3, 4), and Reverse (R):

| | BRAKES | | | CLUTCHES | |
|---|---|---|---|---|---|
| | 1st-Rev. | 2nd | 3rd | 4th | For'd. |
| DRIVES | 81 | 73 | 63 | 51 | 36 |
| R | X | | | X | |
| N | X | | | | |
| 1 | X | | | | X |
| 2 | | X | | | X |
| 3 | | | X | | X |
| 4 | | | | X | X |

FLUID SUPPLY

Referring to FIG. 2b, the fluid exhausted from the control and lubrication systems collects in a sump [not shown] in the lower portion of transmission housing 66. A pump 87, driven by input shaft 10, has a suction line [as shown] in the sump and delivers fluid under pressure to pump outlet line 88 which is connected to priority valve 89. Priority valve 89 has a valve element 91 in a bore 92. A spring 93 biases valve element 91 to contact stop 94 in the closed position. When input shaft 10 is driven to drive pump 87 and supply fluid to pump outlet line 88, which is connected with priority valve to working supply line 96, and when the fluid pressure increases to a value sufficient to operate the transmission shift controls, moves valve element 91 against the bias force of spring 93 to also connect pump outlet line 88 to mainline 97. The spring chamber portion of bore 92 is vented by exhaust, and stop 99 limits movement of valve element 91 in the open position. The conventional pressure regulator valve 101 regulates mainline, and overage is connected to exhaust 102, which may be an overage line conventionally used to supply the torque converter 11 and lubrication systems and then be exhausted.

GOVERNORS

Mainline 97 supplies conventional output governor 103 driven by output shaft 53 and supplying output governor pressure varying with output shaft speed to output governor pressure line 104. Output governor 103 has a plurality of weights to provide a stepped governor pressure curve 105 (FIG. 3), a close proximate of a straight-line governor pressure curve.

SELECTOR VALVE

The manual selector valve 106 (FIG. 2b) has a valve element 107 having equal diameter lands a, b, and c, in bore 108. In all valve positions, mainline 97 is connected to bore 108 between lands 107b and 107c. In neutral (N), mainlain 97 is blocked between lands 107b and 107c. The reverse selector or drive line 111 is connected to exhaust 112. The drive 1 feed line 113, drive 2 feed line 114, and drive 3 feed line 116 are connected to exhaust 117. The drive 4 feed line 118 is connected to hold feed line 119, and these lines are connected by hold regulator valve 121, hold pressure line 122, and drive 3 feed line 116 to exhaust 117.

On movement of selector valve 106 to drive positions, the above exhaust connections provided in neutral are continued, except for the exhaust connection replaced by the following pressure connections. In reverse (R) position, land 107c closes exhaust 112 and connects mainline 97 to reverse drive line 111. In drive 4 position (DR4), mainline 97 feeds drive 4 line 118. In drive 3 position (DR3), mainline 97 additionally feeds hold feed line 119 and blocks the exhaust of drive 3 feed line 116. In drive 2 position (DR2), mainline 97 feeds the same lines and interconnects drive 2 feed line 114 and drive 3 feed line 116. In drive 1 position (DR1), mainline 97 feeds the same lines, and drive 1 feed line 113, drive 2 feed line 114, and drive 3 feed line 116 are interconnected.

HOLD REGULATOR VALVE

The hold regulator valve 121 (FIG. 2b) regulates the pressure distributed by the drive 1, 2, and 3 feed lines, and has a valve element 126 having equal diameter lands *a*, *b*, and *c*, located in a bore 127. A spring 128, located in spring chamber vented by exhaust 129, biases valve element 126 to the open position shown. In the open position shown, the restricted hold feed line 119 is connected to the space between lands 126*b* and 126*c* and supplies hold pressure line 122 which is connected to drive 3 feed line 116. This hold pressure supply line 122 is also connected, via line 116 and restricted passage 131, to closed chamber 132 at the end of bore 127 to act on land 126*a* of valve element 126 to oppose the spring bias force. The pressure in chamber 132 moves valve element 126 against the spring 128 to connect hold pressure supply line 122 to exhaust 133 or hold feed line 119 to regulate hold pressure in hold pressure line 122 at a value less than mainline pressure.

INVERTED THROTTLE PRESSURE REGULATOR VALVE

The inverted throttle pressure regulator valve 136 (FIG. 2b) provides a pressure inversely proportional to torque demand and has a valve element 137 having equal diameter lands *a* and *b* mounted in a bore 138. Spring 139, located in spring chamber 141 at one end of bore 138 vented by exhaust 142, biases valve element 137 to the open position, connecting mainline 97 between lands 137*a* and 137*b* to throttle pressure line 143, which is connected by restricted branchline 144 to chamber 146 at the other end or bore 138 to act on the end of land 137*b* to bias valve element 137 to connect throttle pressure line 143 between lands 137*a* and 137*b* to exhaust 147, to regulate the throttle pressure inversely proportional to throttle angle or torque demand on the engine or the increasing force delivered by actuator 148 as the throttle is advanced from idle to full throttle.

The actuator 148 has a throttle linkage portion, shown as Arrow 149, moving from idle to full throttle in the direction of the Arrow 149 to act on movable abutment 151 in guide bore 152 to compress spring 153 proportional to throttle position and deliver a force via abutment 154 and force-transmitting pin 156, guided in the valve body to valve element 137 proportional to throttle position. The abutments 151 and 154 are guided, but not sealed in bore 152. Exhaust 157 prevents accumulation of leakage fluid in actuator 148.

SHIFT SIGNAL VALVES

Shifting between 1st and 4th speed forward drives is provided by shift signal valves, one for each speed change, and each having an associated relay valve. The shift and relay valves for each speed change are similar to the 1–2 shift signal valve 161 and 1–2 relay valve 186 which are first described in detail. This description also applies to the other valves, the 2–3 and 3–4 shift signal valves 161' and 161" and the 2–3 and 3–4 relay valves 186' and 186", with like parts having the same reference numerals respectively primed and double-primed. Then the different structures and connections of the other valves are described.

These signal and relay shift valves provide an automatic shift control system which functions in response to manual controls to provide in a roading phase, for driving the vehicle, an automatic mode in which automatic speed and torque demand controlled shifting is provided between all ratio drives and a hold mode in which a manually selected hold ratio drive is held up to rated input speed with automatic shifting between the selected hold ratio drive and lower ratio drives and in a working phase, for driving a works, a working mode providing a manually selected working ratio drive without automatic shifting to lower ratios.

This automatic shift control system may have conventional restrictions for restricting flow in both directions, check valves and restrictions for more restricted flow in one direction in supply lines, and trimmer valves connected to supply lines to control shift pressure change for improved shift quality, as taught in the above U.S. Pat. No. 3,691,872 Schaefer and Fox.

The 1–2 shift signal valve 161 (FIG. 2b) has a valve element 162 having land *a* and larger land *b* in a stepped bore 163, and a control element 164 having lands *a*, *b*, and *c*, of progressively increasing diameter, from *a* to *c*, mounted in a stepped bore 166. Land *b* of valve element 162 is larger than land *a* so that when valve element 162 is moved from the downshift position shown in FIG. 2*b* to the upshift position connecting mainline 97 to feed port 167 and 1–2 shift signal line 168 for a shift from 1st to 2nd speed, there is an added hysteresis force in an upshift direction on valve element 162. In the downshift position shown, the 1–2 shift signal line 168 is connected to exhaust 169, and this hysteresis force is dropped. In both downshift and upshift positions, shift control signal line 171 is connected to chamber 172 at the end of bore 163 and provides shift control pressure to act on land *a* of valve element 162 in an upshift direction. Also, throttle pressure line 143 is connected to stepped bore 166 between the largest land *c* and the smaller land *b* of control element 164 to also provide an upshift direction force. Both the governor and throttle pressure upshift direction forces are opposed by the downshift direction bias force of spring 173, which is mounted on a suitable spring seat and stop assembly 174 in a spring chamber 176 vented by exhaust 177. When governor pressure and throttle forces overcome the spring bias force, both valve elements 162 and 164 upshift, and the throttle pressure from line 143 is also connected between lands *a* and *b* of valve control element 164. Since land 164*b* is larger than land 164*a*, there is an additional area and upshift force after upshifting to control the downshift. This change in force is the torque demand hysteresis force. The drive 1 line 113 supplies hold pressure and is connected via branch hold line 178 to hold shift valve element 162 in the downshift position when downshifted, or via branch hold line 179 when shift valve element 162 is upshifted to downshift shift valve element 162 at a predetermined speed. The regulated hold pressure supplied is insufficient to downshift above a predetermined speed.

The 2–3 shift signal valve 161' is similar to 1–2 shift signal valve 161, so reference numerals, primed, and reference to the above description for the similar portions are used, and the different portions described below.

The 2–3 shift valve element 162' has an additional larger land 162*c*', so the proportion of the areas of lands 162c' to 162a' is greater than the proportion of the areas of lands 162b to 162a so the same hold pressure can be used for the 1–2 and 2–3 shift signal valves 161,161'. The stepped bore 163' has an additional step for land 162c' and an exhaust 180 at the additional step. The 2–3 shift signal valve 161' functions similarly in response to shift control signal pressure in chamber 172' supplied by shift control signal line 171, and throttle pressure line 143 acting on control element 164' for upshifting and downshifting at higher speeds than the 1–2 shift signal valve 161. On an upshift, the 2–3 shift signal valve 161' connects mainline 97 to feed port 167' and 2–3 shift signal line 181.

The 3–4 shift signal valve 161" is like the 2–3 shift signal valve 161' described above, except for area and/or spring change to provide shifting at higher speeds, so reference numerals, double-primed, have been used and reference to the above description is made. The 3–4 shift signal valve 161", on an upshift, connects mainline 97 to feed port 167" and 3–4 shift signal line 182.

RELAY VALVES

The 1–2 relay valve 186 (FIG. 2a) has a valve element 187, having equal diameter lands a, b, and c, located in a bore 188, and is biased to the 1st or lower speed position shown by spring 189 on spring seat 191 located in closed chamber 192. Valve element 187 has an integral valve stop and spring guide member 190. The chamber 192 is connected by a port 193 in guide member 190 and a passage 194 through valve element 187 to a port 196 located in groove 197 in the land 187a to exhaust chamber 192 only in the upshift position to exhaust port 198. Mainline 97 supplies pressure to low feed port 201 and high feed port 202. The priority valve 203, constructed as shown in the above Schaefer et al U.S. Pat. No. 3,691,872, may be used in the portion of mainline 97 only feeding feed ports 201, 202, and has arranged in parallel a restriction and a full-flow relief valve closing to prevent full flow to 1–2 relay valve 186 when the pressure in mainline 97 is insufficient for properly operating the transmission, and open when the pressure is sufficient.

The 1–2 relay valve 186, in the 1st speed position shown, connects 2–3 shift feed line 206 via high supply port 207 between lands 187a and b, to exhaust port 198, blocks high feed port 202, connects mainline 97 via low feed port 201 between lands 187b and c via low supply port 209 to 1st apply line 211; land 187c blocks exhaust port 212, connects reverse drive line 111 from the manual selector valve 106 to port 213 adjacent land 187c to spring chamber 192, which is closed since passage 194 is blocked at land 187a, and connects spring chamber 192 via port 214 to reverse feed line 216. When the 1–2 shift signal valve 161 provides pressure in 1–2 shift signal line 168 to supply fluid to closed actuator chamber 217, 1–2 relay valve element 187 is moved against the bias force of spring 189, except in reverse, to the 2nd speed position. Then reverse feed line 216 is connected to exhaust, via port 214 and spring chamber 192 which is connected via passage 194 to exhaust port 198; mainline 97 is connected via high feed port 202 to high supply port 207 and 2–3 shift feed line 206, low feed port 201 is blocked by land 187b; the 1st apply line 211 is connected via low support 209 to exhaust port 212, and reverse selector or drive line 111, at its port 213 is blocked by land 187c.

Thus during any forward drive operation, 1–2 relay valve 186 in the low or downshifted position shown, connects mainline 97 to 1st apply line 211 to engage 1st-reverse brake 81 and to exhaust 2–3 shift feed line 206, so the higher ratio devices are disengaged, and in high or upshifted position, exhausts 1st apply line 211 to disengage 1st brake 81 and connects mainline 97 to 2–3 shift feed line 206, so a higher ratio can be engaged. In reverse position, manual valve 106 supplies reverse selector or drive line 111 which, when the 1–2 relay valve 186 is in the 1st or low position, feeds reverse feed line 216 and pressurizes spring chamber 192 to hold 1–2 relay valve 186 in 1st or reverse position.

The 2–3 relay valve 186' is similar to the 1–2 relay valve 186, so like reference numerals, primed, have been used with reference to the above description. The minor differences and port connections are pointed out below.

The structure of the 2–3 relay valve 186' is like 1–2 relay valve 186, except the passage 194 in valve element 187 and its ports 193 and 196 are omitted, also port 213 is omitted, and the valve stop and spring guide 190' is a separate member. The 2–3 relay valve 186' has an actuator chamber 217' connected to 2–3 shift signal line 181, exhaust port 198', high supply port 207' connected to 3–4 shift feed line 218, low and high feed ports 201' and 202', both connected to 2–3 shift feed line 206, low supply port 209' connected to 2nd apply line 219, exhaust port 212' and exhaust port 214', always exhausting spring chamber 192'. The reverse drive and feed lines 111 and 216 are not connected to the 2–3 relay valve 186'. In forward drive ranges, when the 1–2 relay valve 186 upshifts to supply 2–3 shift feed line 206, the 2–3 relay valve 186', in low position, connects the 2–3 shift feed line 206 via port 201' to 2nd apply line 219 to engage 2nd brake 73, and connects the 2–4 shift feed line 218 to exhaust port 198'. In the high position, the 2–3 relay valve 186' connects 2nd apply line 219 to exhaust port 212' and the 2–3 shift feed line 206 to 3–4 shift feed line 218.

The 3–4 relay valve 186" is like the 2–3 relay valve 186', and like reference numerals, double-primed, have been used and reference is made to the above description of the valve structure.

The 3–4 relay valve 186" has an actuator chamber 217" connected to 3–4 shift signal line 182, a port 198" connected to reverse feed line 216, a high supply port 207" connected to 4th clutch apply line 221, low and high feed ports 201" and 202", both connected to 3–4 shift feed line 218 and a low supply port 209" connected to 3rd apply line 222. When in forward drive ranges with the 1–2 relay valve 186 and 2–3 relay valve 186' upshifted to supply 3–4 shift feed line 218, the 3–4 relay valve 186", in low position shown, connects 3–4 shift feed line 218 to 3rd apply line 222 to engage 3rd brake 63, and connects 4th apply line 221 to exhausted port 198" which is exhausted via reverse feed line 216, spring chamber 192, passage 194 and exhaust port 198 of 1–2 relay valve 186 to disengage 4th clutch 51. When 3–4 relay valve 186" is upshifted, 3rd apply line 222 is connected to exhaust port 212" to disengage 3rd brake 63, and 3–4 shift feed line 218 is connected to 4th apply line 221 to engage 4th clutch 51 for 4th speed drive.

WORKING SYSTEM

Drive

The transmission output shaft 53 is connected by a conventional disconnect clutch assembly 226 during roading operation to drive the drive shaft 227 and vehicle differential axle and wheel assembly 228 to drive a vehicle, and during working operation, to drive power take-off or working gear 229 to drive a works, such as an oil well drilling rig derrick. The diagrammatically illustrated conventional disconnect clutch 226 has an internally splined clutch sleeve 231 spline mounted on the externally splined output shaft 53, so clutch sleeve 231 is axially movable relative to output shaft 53 between roading position [R] and working position [W] and driven by output shaft 53 in all positions. When clutch sleeve is in the roading position [R] shown, roading drive clutch 232, which has a toothed portion on clutch sleeve 231 and on drive shaft 227, is engaged to connect output shaft 53 to drive drive shaft 227 for vehicle drive with working drive clutch 233 disengaged. When sleeve 231 is moved to the working position [W], working drive clutch 233, which has a toothed portion on clutch sleeve 231 and on working gear 229, is engaged to drive connect output shaft 53 to working gear 229 for power take-off drive, with roading drive clutch 232 disengaged. The clutch operating mechanism includes an annular shift channel 234 on the external surface of sleeve 231, a clutch control lever 236 mounted on a fixed pivot 237, with one end in channel 234 and the other end pivotally connected to rod 238 of conventional air cylinder 239 which is spring-biased to the roading position [R] shown, engaging roading drive clutch 232 and air-operated to the working position ([W] dotted lines) engaging working drive clutch 233.

Remote Control

The remote control system 241 has a 3-way manual valve 242 connecting main air supply 243 supplied by air pressure source or supply 244 in the roading position [R], shown in solid lines, to roading supply line 245 and exhausting working supply line 246 to exhaust 247 and, in the working position [W], shown in dotted lines, to working supply line 246 and to exhaust roading supply line 245 to exhaust 247. The roading and working supply lines 245,246, are respectively connected to supply the roading and working 6-position valves 248,249, respectively controlled by roading and working shift levers 251,252, providing the cab or roading shift control 253 and the deck or working shift control 254. Both the roading and working 6-position valves 248,249, are connected by a multipassage conduit 256 to a 6-position air cylinder 257 having a 6-position rod 258. When the roading working 3-way manual valve 242 is selectively placed in the roading position [R] or working position [W], air is supplied to the respective selected one of the roading or working controls 253 or 254, and the other is connected to exhaust 247. The selected one of the roading or working shift controls, when positioned in Reverse (R), Neutral (N), 4th Forward (F4), 3Forward (F3), 2nd Forward (F2), or 1st Forward ($F_1$) positions, places the 6-position air cylinder 257, its rod 258, a connecting linkage 259, and working manual valve 263 in a corresponding position. When roading working manual valve 242 is in working position [W] supplying air to working supply line 246, this line may also be connected to clutch air cylinder 239 to disengage roading drive clutch 232 and engage working drive clutch 233. Also, in working position [W] of manual valve 242, the supply of air to working line 246 opens normally spring closed shut-off valve 261, to working line 96 supplies the working mode controls 262.

The 6-position valves 248,249, are conventional, preferably Model 6P55 No. P57081 6-position ROTAIR VALVES, and the 6-position air cylinder is No. P54500 7-position (6positions employed), made by Wabco Fluid Power Division of Westinghouse Air Brake Company of Lexington, Kentucky. While simple 6-position valves selectively providing pressure in each position (except Neutral), to a different line to a cylinder, spring-biased to Neutral position, and having a step piston for each forward position, having a length equal to the travel distance from Neutral position to the selected forward position, and a reverse position would cause the air cylinder to move to the same position as selected by the valve, the Wabco valve and cylinders accomplish the same result with fewer connecting lines.

The working mode controls 262 have a working manual valve 263, having a valve element 264 with equal-diameter lands $a$ and $b$ in bore 266. The smaller diameter portion 267 of valve element 264 between lands 264$a$ and $b$ has a plurality of grooves 268, one for each valve position, cooperating with a spring-loaded ball detent 269 to hold valve element 264 in its manually selected positions: Reverse (R), Neutral (N), 4th Forward (F4), 3rd Forward (F3), 2nd Forward (F2), and 1st Forward (F1), as positioned by air cylinder 257 and connecting linkage 259. When working manual valve 263 has its valve element 264 in Reverse (R) and Neutral (N) positions, land 264$a$ blocks supply port 271 connected to working supply line 96, and 2nd, 3rd, and 4th working signal lines 272, 273, and 274 are connected between lands 264$a$ and $b$ to exhaust 276. The ends of bore 266 are vented by exhausts 277 and 278 when one end is a blind bore and the other has seal 279. When valve element 264 is in the 4th Forward (F4) position, land 264$b$ blocks exhaust 276, and working supply line 96 and supply port 271 are connected between lands 264$a$ and $b$ to the respective 4th, 3rd, and 2nd working signal lines 274 and 273, and 272. As valve element 264 is moved to the respective (F3), (F2), and (F1) positions, the 4th working signal line 274, 4th and 3rd working signal lines 274 and 273, and the 4th, 3rd, and 2nd working signal lines 274, 273, and 272 are connected to exhaust 276.

The ratio regulator valve 281 has a valve element 282 having large equal diameter lands $a$ and $b$ in large bore portion 283 and smaller land 282$c$ in smaller bore portion 284 of bore 285. A biasing spring 286 in the closed chamber 287 at the end of bore 285 is seated on the closed end of the chamber and engages the free end of small land 282$c$ to bias valve element 282 to increase regulated ratio control pressure in line 288. The ratio control pressure line 288 is connected to port 289, always between lands 282$a$ and $b$, and to closed chamber 291 at the end of large bore portion 283, to act on the free end of land 282$a$ to bias valve element 282 to decrease ratio control pressure. The 2nd working signal line 272 is connected to large bore portion 283 at port 292 at the regulating edge of large land 282$a$. Exhaust 293 is connected to large bore portion 283 at the regulating edge of large land 282$b$. The 3rd working signal line 273 is connected to port 294 at the step between large bore portion 283 and smaller bore portion 284 to act on the differential area between large land 282$b$ and smaller land 282$c$ to increase the regulated pressure. The 4th working signal line 274 is connected by port 296 to closed chamber 287 to act on the free end of small land 282$c$ to also increase the regulated pressure in ratio control pressure line 288.

In 1st position (F1) of working manual valve 263, since all working signal lines 272, 273, and 274 are exhausted, 2nd working signal line 272 does not supply fluid to ratio regulator valve 281 so regulated 1st working ratio pressure in line 288 is zero. In 2nd position (F2) of working manual valve 263, only 2nd working signal line 272 is supplied, so the spring 286 bias force provides a low 2nd working ratio regulated pressure in line 288. In 3rd position (F3), 2nd and 3rd working signal lines 272 and 273 are supplied, so a higher or intermediae 3rd working ratio regulated pressure is provided in line 288. In 4th position (F4), 2nd, 3rd, and 4th working signal lines 272, 273, and 274 are supplied, so the highest 4th working ratio regulated pressure is provided in line 288. These 1st, 2nd, 3rd, and 4th working ratio regulated pressures are constant values at all transmission output speeds, as shown by curves 1st, 2nd, 3rd, and 4th MANUAL (FIG. 3). The working ratio regulated pressure for each ratio is greater than the governor pressure required to provide an automatic upshift from the next lower ratio to that ratio, and less than the governor pressure required to provide an inhibit downshift into that ratio from the next higher ratio. Referring to FIG. 3, the 3rd MANUAL pressure is greater than governor pressure 105 at the 2-3 automatic shift point (2-3A), and less than governor pressure at the 4-3 inhibit shift point (4-3 inh).

The working ratio regulated pressure line 288 and output governor pressure line 104 are both connected to shuttle valve 298 which connects the higher pressure to shift control signal line 171 to control the shift signal valves 161, 161', and 161".

OPERATION

When the engine driving this transmission is running, the transmission input driven pump 87 supplies fluid from a sump [as shown] under pressure to pump outlet line 88 which is always connected by priority valve 89 to working supply line 96, so the working mode controls 262 may be first supplied with fluid. When this fluid supply pressure, which will only be in working supply line 96 to closed shut-off valve 261 in roading positions of the controls or to closed working manual valve 263 in the neutral working position or to the entire functioning working mode controls 262 in other working positions, rises to a pressure value sufficient for transmission operation but less than mainline regulated pressure, the priority valve 89 opens to connect pump outlet line 88 to mainline 97. When the pump supply meets control system requirements, mainline pressure is regulated at a normal pressure value (e.g., 180 psi), when the transmission is in forward drive, and at a higher reverse drive pressure value (e.g., 300 psi), in reverse drive, by conventional pressure regulator valve 101. The pressure regulator overage, indicated by exhaust 102, may be conventionally maintained above a low pressure value, e.g., 80 psi, used to supply the torque converter 11 and the lurication system for the transmission gearing.

For normal roading operation, driving the vehicle, roading working manual valve or 3-way manual valve 242 is placed in the roading position (R) supplying air from air pressure supply 244, so roading shift control 253, when placed in its positions (R), (N), (F4), (F3), (F2), and (F1), controls 6-position air cylinder 257 and its rod 258 which is connected by connecting linkage 259 to both the manual selector valve 106 of the shift controls and to working manual valve 263 of working mode shift controls 262 to respectively position manual selector valve 106 in positions (R), (N), (DR 4), (DR 3), (DR 2), and (DR 1), and working manual valve 263 in positions (R), (N), (F4), (F3), (F2), and (F1). Also, the shut-off valve 261 is spring-closed so there is no fluid supply to working manual valve 263, so the pressure in working ratio pressure line 288 is always zero during roading operation, so rear or output governor pressure line 104 is connected by shuttle valve 298 to shift control signal line 171 to actuate the shift signal valves 161, 161', and 161". Also, clutch control lever 236 is placed in the roading position [R] by clutch air cylinder 239 which is spring-biased to the working position [W] or manually positioned if an air cylinder is not used to engage roading drive clutch 232 to drive the vehicle.

In neutral position (N), the manual selector valve 106 connects reverse drive line 111 to exhaust 112, and drive 1 line 113, drive 2 line 114, and drive 3 line 116 to exhaust 117. The drive 4 line 118 is connected to hold feed line 119, and both are exhausted via hold regulator valve 121 and drive 3 line 116 to exhaust 117. Mainline 97 supplies the inverted throttle pressure regulator valve 136, output governor 103, and 1-2, 2-3, 3-4 shift signal valves 161, 161', 161", and 1-2 relay valve 186. The inverted throttle pressure regulator valve 136 provides inverted throttle pressure in line 143 inversely proportional to torque demand. The transmission output governor 103 provides an output governor signal in line 104 that is a function of output speed. The hold pressure regulator valve 121 is not supplied, and thus there is no hold pressure in line 122.

Normally when the selector valve 106 is in neutral (N) position, the output or vehicle driven thereby will be stationary, or nearly so, and the engine is running to pressurize the system as pointed out above. The output governor pressure and throttle pressure will be insufficient to overcome the spring downshift bias force, so the 1-2, 2-3, and 3-4 shift signal valves 161, 161', and 161" will be in the downshift position, connecting the 1-2, 2-3, and 3-4 shift signal lines 168, 181, and 182, respectively, to exhausts 169, 169', and 169". Mainline 97 is directly connected to each shift signal valve 161, 161', 161", and blocked by the respective land 162b, 162b', and 162b", thereof. Since there is no shift signal pressure, the 1-2, 2-3, and 3-4 relay valves 186, 186', and 186" are spring biased to the downshift or lower speed position. Mainline 97 is then directly connected by downshifted 1-2 relay valve 186 to 1st brake apply line 211 to engage 1st brake 81. Thus when the engine is running and manual selector valve 106 is in neutral (N) position, torque converter 11 is filled and operative and at slow output speed, the 1st brake 81 is engaged and all other drive establishing devices disengaged for a positive neutral, and the automatic shift control system is ready for drive operation.

If the output is driven at higher speeds by the vehicle, with manual selector valve 106 inadvertently positioned in neutral (N) and the engine running, the output governor and throttle pressure automatic control system will function as during automatic shifting drive, described below, to position the shift signal valves and relay valves in accordance with speed and torque demand to selectively engage 1st brake 81, 2nd brake 73, 3rd brake 63, or 4th clutch 51, but the transmission remains in positive neutral because forward clutch 36 is disengaged.

On movement of manual selector valve 106 to any forward drive position, forward clutch 36 will be engaged to engage the drive speed selected by the automatic controls. The drive and coasting automatic shift engagement sequence is the same. The drive is always completed by the forward clutch in 1st ratio and by the 2nd, 3rd, or 4th speed establishing device in 2nd, 3rd, and 4th ratios.

On shifting manual selector valve 106 to the drive 4 position (DR 4) at output speeds and torque demand values insufficient to upshift 1-2 shift signal valve 161, mainline 97 is directly connected to drive 4 line 118 to directly supply fluid to engage forward clutch 36 to complete engagement of 1st speed drive since 1st brake 81 was engaged in neutral and remains engaged.

The other drive establishing devices are exhausted to disestablish the other drives. The 2nd brake apply line 219 is connected by downshifted 2-3 relay valve 186' to 2-3 shift feed line 206 which is connected by downshifted 1-2 relay valve 186 to exhaust port 198 for disestablishing 2nd brake 73. The 3rd brake apply line 222 is connected by downshifted 3-4 relay valve 186" to 3-4 shift feed line 218 which is connected by downshifted 2-3 relay valve 186' to exhaust port 198' to disengage 3rd brake 63. The 4th clutch apply line 221 is connected, via downshifted 3-4 relay valve 186" to reverse feed line 216 which is connected by 1-2 relay valve 186 and reverse drive line 111 to exhaust 112 at manual selector valve 106 to disengage 4th clutch 51.

When the speed of the vehicle increases, governor signal pressure supplied by line 104 and shuttle valve 298 to shift signal line 171 upshifts 1-2 shift signal valve 161 against the spring bias force of spring 173, reduced by the throttle bias force provided by throttle pressure from line 143 acting on control element 164. The upshifted 1-2 shift signal valve 161 closes exhaust 169 and supplies mainline 97 pressure to 1-2 shift signal line 168 which acts in actuator chamber 217 to upshift 1-2 relay valve 186 from the downshifted position against the spring bias force of spring 189 to the upshifted position. Upshifted 1-2 relay valve 186 connects 1st apply line 211, which had engaged 1st brake 81, to exhaust port 212 to disengage 1st brake 81 and connects mainline 97 from high feed port 202 between 1-2 relay valve element lands 187a and b to 2-3 shift feed line 206 which is connected by low feed port 201' between lands 187b' and 187c' of downshifted 2-3 relay valve 186' to 2nd brake apply line 219 for engagement of 2nd brake 73 for 2nd speed drive.

At a higher speed, governor signal pressure similarly upshifts 2-3 shift signal valve 161', so 2-3 shift signal line 181 is disconnected from exhaust 169' and connected to mainline 97. The 2-3 shift signal line 181 is connected to actuator chamber 217' of 2-3 relay valve 186' to upshift this valve 186' to the upshifted position connecting 2nd brake apply line 219 to exhaust port 212' and connecting the 2-3 shift feed line 206, via high feed port 202' between lands 187a' and 187b' to 3-4 shift feed line 218, which is connected by low feed port 201" between lands 187b" and 187c" of downshifted 3-4 relay valve 186" to 3rd brake apply line 222, to engage 3rd brake 63 for 3rd speed drive.

At a still higher speed, the governor signal pressure will upshift the 3-4 shift signal valve 161", so 3-4 shift signal line 182 is disconnected from exhaust 169" and connected to mainline 97 to supply pressure to actuator chamber 217" to upshift 3-4 relay valve 186". Upshifted 3-4 relay valve 186" will then connect 3rd brake apply line 222 to exhaust port 212" and connect 3-4 shift feed line 218 via high feed port 202", to 4th clutch apply line 221 and 4th clutch 51 to engage 4th speed drive.

A reduction of governor signal pressure due to decreasing output speed and/or throttle pressure due to increasing torque demand will effect a downshift of the shift signal valves sequentially, 3-4 shift signal valve 161", 2-3 shift signal valve 161", and then 1-2 shift signal valve 161, to provide the reverse of the above-described upshifting operation and thus provide downshifting in this sequence.

In FIG. 3, on the plot of output governor pressure relative to transmission output speeds (curve 105), a typical position of these automatic mode shifts (upshifts 1-2A, 2-3A, etc., and downshifts 2-1A, 3-2A, etc.), is shown for full throttle operation. These shifts occur at proportionally lower speeds with proportionally lower part throttle operation. These shifts are provided during roading operation with the roading or cab shift control 253 in F4 position and manual selector valve 106 in DR 4 position.

When the manual 3-way valve 242 is in roading position [R] and the roading control 253 is placed in the (F3), (F2), or (F1) positions to place manual valve 106 respectively in the (DR 3), (DR 2), or (DR 1) positions, the hold mode operation is provided. In each hold mode position (e.g., DR 3), automatic mode shifting (e.g., 1-2A, 2-3A, 3-2A, and 2-1A), is provided between the selected hold ratio, e.g., 3rd ratio in DR 3, and lower ratios. The transmission is held in the selected ratio, e.g., 3rd, for engine drive to maximum engine speed, and then upshifted at the hold upshift, e.g., 3-4 hold, the maximum output speed in the selected ratio, which is the output speed at maximum engine speed in the selected ratio.

Movement of manual selector valve 106 to drive 3 position (DR 3), in addition to supplying previously supplied drive 4 line 118, also feeds the hold feed line 119 and blocks the exhaust of drive 3 feed line 116. Thus the hold pressure is regulated by hold regulator valve 121, when supplied with mainline 97 pressure by hold feed line 119, and supplies hold pressure via hold pressure line 122 to drive 3 feed line 116, which is connected by port 178" or 179" between 3-4 shift signal valve element 162" and control element 164" to downshift 3-4 shift signal valve 161" or hold it downshifted at a higher speed than during normal governor throttle operation. Thus normal power driving would be limited to 1st or 3rd speed ratio drives with automatic shifting between these ratios, but higher hold upshift speed coast upshifts to 4th speed drive are made, 3-4 HOLD shift, to prevent engine overspeed in hold ratios.

Movement of manual selector valve 106 to the drive 2 position (DR 2) will additionally interconnected the drive 3 feed line 116 to also supply hold pressure to drive 2 line 114 which is similarly connected and acts on 2-3 shift signal valve 161' for shifting from 2nd to 3rd speed position at a higher hold upshift speed, so during normal power drive, only automatic shifts between 1st and 2nd speed drives are provided, but with higher speed coast upshifts, 2-3 HOLD and 3-4 HOLD, to 3rd and 4th prevent engine overspeed.

Movement of manual selector valve 106 to the drive 1 position (DR 1) additionally connects hold pressure from drive 3 feed line 116 to drive 1 line 113 which is similarly connected and acts on 1-2 shift signal valve 161 to control 1-2 relay valve 186 to normally hold 1st speed, but to permit coast upshifts at the hold upshift points. In FIG. 3 on the governor pressure curve 105, hold mode operation upshifts (1-2 HOLD, 2-3 HOLD, etc.,) and inhibited downshifts (2-1 INH, 3-2 INH, etc.,) are indicated in a typical relation to the automatic shift points. The hold upshifts occur when the vehicle or load overruns the engine to provide an upshift when maximum output speed in each ratio causes the engine to overrun at maximum speed. In the hold mode, manual downshifts and output speed responsive downshifts are inhibited or delayed until output speed is reduced so that a downshift will not cause the engine to overrun above maximum speed. Thus in the 3rd ratio hold position (DR-3) of selector valve 106, during roading phase hold mode operation, automatic upshifts (1–2A and 2–3A) and downshifts (3–2A and 2–1A) are provided between the selected ratio, 3rd, and lower ratios since hold pressure is not connected to the 1-2 and 2-3 shift signal valves 161 and 161'. The hold pressure directed to 3-4 shift signal valve 161" provides the upshift from the selected ratio to the higher ratio, 3-4 HOLD, at a higher speed than the automatic upshift, 3-4A, so maximum engine speed can be used for engine braking and maximum engine speed is not exceeded. A downshift, 4–3 INH, from a ratio, 4th, higher than the selected ratio, due to mainline hysteresis on the 3–4 shift signal valve 161", occurs at a speed lower than the 3-4 hold shift speed, but higher than the 3-4 automatic shift, 3-4A. Thus when the transmission gearing is in the 4th ratio and the controls in DR-3 position, the output speed on reducing to the 4–3 INH speed will provide a 4–3 shift. Also, when the transmission gearing is in 4th ratio and a manual downshift is made from DR-4 to DR-3, the 4–3 shift will be inhibited until speed is reduced to the 4–3 INH speed. In 2nd hold ratio position, DR-2, of the selector valve 106 during hold mode operation, automatic shifting is provided between the selected ratio, 2nd, and the lower ratio 1st, 1–2A and 2–1A, and hold shifting between the selected ratio and higher hold ratios 2–3 HOLD and 3–4 HOLD and 4–3 INH and 3–2 INH. In 1st hold ratio position, DR-1, hold mode operation since 1st ratio is selected, there is no automatic shifting but there is hold shifting between the selected and higher ratios.

In order to make a shift to reverse, the manual selector valve 106 must be first moved to Neutral (N) position, placing the control system in the above-described neutral condition, and then to Reverse (R) position. In the reverse position, manual selector valve 106 exhausts drive 4 line 118 through exhausted hold feed line 119, hold regulator valve 121, and exhausted drive 3 line 116 to exhaust 117. Exhausting the drive 4 line 118, as in neutral, prevents establishing forward drive clutch 36, so forward drive ratios cannot be established.

To establish reverse drive, the output speed must be low so the respective 1–2, 2–3, and 3–4 shift signal valves 161, 161', 161", downshift to place the 1-2, 2-3, and 3-4 relay valves 186, 186', 186", in the downshift position. Selector valve 106, in reverse position (R), connects mainline 97 to reverse drive line 111 which, with 1-2 relay valve 186 and 3-4 relay valve 186" in the downshift position, operates to engage 1st brake 81 and 4th clutch 51 to establish reverse drive. If the transmission output is running at speeds sufficient to call for establishment of 2nd or higher speeds by the automatic control system, exhausting drive 4 line 118 places the transmission in neutral. When the speed reduces to a low value, sufficient for a downshift of 1-2 shift signal valve 161 and 1-2 relay valve 186, the 1-2 relay valve 186 connects mainline 97, through low feed port 201 to 1st brake apply line 211 to engage 1st brake 81 and connects reverse drive line 111, as passage 194 is blocked, to reverse feed line 216 which is connected by downshifted 3–4 relay valve 186" to 4th apply line 221 to engage 4th clutch 51 for reverse drive.

When the roading working valve 242 is placed in the working position [W], air pressure is supplied from air supply 243 to working line 246 which supplies working shift control 254, which, in the positions (R), (N), (F4), (F3), (F2), and (F1), correspondingly positions 6-position air cylinder 257, its rod 258, and through connecting linkage 259 both working manual valve 263 and manual selector valve 106 in their corresponding positions.

Also, the air pressure supplied by working line 246 opens shut-off valve 261 to connect working supply line 96 to working manual valve 263, so the working mode control 262 is operative. Also, air pressure is supplied to clutch cylinder 239 to move clutch lever 236, or this lever is moved manually, to disengage roading drive clutch 232 to disconnect the vehicle drive and to engage working drive clutch 233 to drive the works gear 229 and connected works, such as a derrick or well drilling rig.

During the working phase, the manual selector valve 106 is moved in the same manner as during the roading phase to control the shift signal valves 161, 161', 161", but is also subject to control by the working mode control 262. As pointed out above, during the roading phase, the manual selector valve 106 controls the shift signal valves 161, 161', and 161", in DR-4 position to provide automatic shifting between 1st through 4th ratios; in DR-3 position to provide automatic shifting between 1st through 3rd ratios and hold shifting between 3rd and 4th ratios; in DR-2 position to provide automatic shifting between 1st and 2nd ratios and hold shifting between 2nd through 4th ratios; and in DR-1 position to provide hold shifting between 1st through 4th ratios. Hold shifts, as indicated in FIG. 3, occur at higher output speeds than the corresponding automatic shifts and occur during engine overrun to prevent input speed exceeding maximum engine speed where it can be avoided by a hold upshift. Manual downshifts are also inhibited to prevent input speed exceeding maximum engine speed.

The working or deck shift control 254, when placed in positions R, N F4, F3, F2, and F1, places the working manual valve 263 in corresponding positions and manual selector valve 106 respectively in positions R, N, DR-4, DR-3, DR-2, and DR-1. The working manual valve 263 in F1 position does not supply any signal pressure or supplies zero signal pressure, in F2 position supplies 2nd working signal pressure line 272, in F3 position additionally supplies 3rd working signal pressure line 273, and in F4 position additionally supplies 4th working signal pressure line 274. The ratio pressure regulator valve 281, in response to the signal pressure or pressures normally having a mainline pressure value supplied by the working manual valve 263, provides increasing ratio pressures with increasing ratio position of working manual valve 263. In F1 position, this valve 263 provides in ratio pressure line 288 zero or a low 1st ratio manual pressure, and the hold controls provide 1st ratio drive at all speeds up to the 1-2 hold upshift speed, 1-2 HOLD. In F2 position, this valve 263 provides 2nd ratio manual pressure (2nd MANUAL FIG. 3) in line 288 which is above governor pressure at the 1-2 automatic shift point, 1-2A, but below governor pressure at the 3-2 inhibit shift point, 3—2 inh, to provide 2nd ratio drive at all speeds up to the 2-3 hold shift speed. In F3 position, this valve 263 provides 3rd ratio manual pressure, 3rd MANUAL, in line 288 which is above the 2-3 automatic shift governor pressure, 2-3A, and below the governor pressure at the 4-3 inhibit shift point, 4-3 INH, to provide 3rd ratio at all speeds up to the 3-4 hold upshift speed. In F4 position, valve 263 provides 4th ratio manual pressure, 4th MANUAL, in line 288 which is above the 3-4 automatic shift governor pressure, 3-4A, to provide 4th ratio at all speeds.

The shuttle valve 298 connects the higher of the ratio manual pressure in line 288 and the output governor pressure in line 104 to shift control signal line 171 to actuate the shift signal valves 161, 161', and 161". Thus, in the working phase the controls provide the selected ratio and prevent automatic downshifts due to reduction of output speed. The hold controls remain operative to provide hold upshifts, e.g., 3-4 HOLD, at the output speed when input speed exceeds maximum engine speed, and hold downshifts, e.g., 4-3 INH, at the lower output speed, so input speed will not exceed maximum engine speed after the downshift. Also, in the working phase, manual downshifts are effected only when the output speed is at or below the inhibiting speed for the corresponding hold mode downshift. For example, when operating in 4th ratio working mode, F4, a manual downshift of the working shift control 253 to 3rd ratio working mode, F3, will not provide a 4-3 shift unless the output speed is at or below the 4-3 inhibiting speed (4-3 INH, FIG. 3). Thus in the working mode, the transmission may be retained in one ratio drive so the output speed may be progressively varied by variation of engine throttle throughout the normal engine drive speed range. In the lower ratios, hold upshifts, e.g., 3-4 HOLD, are provided at maximum engine speed to prevent engine overspeed. Manual downshifts are inhibited until speed is reduced so they will not cause input or engine speed to exceed maximum engine speed after the downshift. Thus the operator may select a proper ratio for engine drive of the working load and progressively vary the output and working implement speed by progressively varying throttle. The manual ratio pressure for each selected ratio except the lowest is greater than the governor pressure providing an automatic upshift from the next lower ratio to the selected ratio at full throttle, so there is no speed responsive downshift to the next lower ratio. The manual ratio pressure for each selected ratio except the highest is less than the governor pressure at the inhibit shift point providing a hold or manual downshift from the next higher ratio. While the manual control system would function with each manual ratio pressure at the lower limit at the governor pressure for automatic upshift to that ratio and at the upper limit at the governor pressure providing an inhibit downshift to that ratio, an intermediate value in this large range between these limits is preferred so the above described manual operation is provided even though there is variation of the governor pressure at the shift points and the same manual control system 262 can be used on different transmissions having different shift point governor pressures. On a shift from roading operation to working operation for manual shift control and on employed shifts between manual shift control positions, neutral and the ratio drive positions the working manual shift pressures, the hold pressure and the regulated manual pressure, are effective for manual ratio selection and establishment and disable the automatic controls before they can establish a ratio. Thus the upper limit of each manual pressure range need not be limited to the governor pressure at the automatic upshift point to the next higher ratio. This working manual shift system may be used in transmissions, where on some employed manual ratio shift an automatic shift could occur, by providing the manual pressure in a range only to an upper limit equal to the governor pressure providing an automatic upshift to the next higher ratio.

When governor pressure exceeds manual ratio pressure, governor pressure acts in the shift signal valves and at the hold upshift point provides an upshift to the next higher ratio, so overrun drive will not drive the input in excess of maximum engine speed.

The above-described preferred embodiment is illustrative of the invention which may be used in modified forms.

We claim:

1. In a transmission: gear means having an input with a normal engine drive speed range and a higher engine maximum overrun speed and an output and providing a plurality of ratio drives between said input and said output having speed ratios continuously increasing in steps from a lowest ratio drive to a highest ratio drive; governor means connected to said gear means and providing a speed signal varying with the speed of said output; control means operatively connected to said gear means and said governor means, having manual selector means having a hold ratio position corresponding to each of said plurality of ratio drives except for said highest ratio drive and a plurality of working ratio positions corresponding to each of said plurality of ratio drives and operative in each of said selected hold ratio positions to provide automatic upshifting and downshifting in response to said speed signal between the corresponding selected hold ratio drive and any lower ratio drives of said plurality of ratio drives to provide optimum drive of said output with said input in said drive speed range, operative in each of the selected working ratio positions to provide the corresponding selected working ratio drive throughout said drive speed range to provide output speed in a constant ratio drive proportion to input speed and controllable by engine throttle control of input speed, and operative in each of said selected hold ratio drives and each of said selected working ratio drives to provide hold shifting between either the selected hold ratio drive or the selected working ratio drive and a higher ratio drive having an upshift at the maximum overrun output speed in the selected hold ratio drive and working ratio drive to prevent input speed exceeding maximum overrun speed and a downshift from the higher ratio drive at a lower output speed to provide input speed which is a hysteresis amount less than maximum overrun engine speed after said downshift.

2. In a transmission: gear means having an input with a normal engine drive speed range and a higher engine maximum overrun speed and an output and providing a plurality of ratio drives between said input and said output having speed ratios continuously increasing in steps from a lowest ratio drive to a highest ratio drive; governor means connected to said gear means and providing a speed signal varying with the speed of said output; control means operatively connected to said gear means and said governor means, having manual selector means having an automatic position to provide automatic upshifting and downshifting in response to said speed signal between said plurality of ratio drives, a hold ratio position corresponding to each of said plurality of ratio drives except for said highest ratio drive and a plurality of working ratio positions corresponding to each of said plurality of ratio drives and operative in each of said selected hold ratio positions to provide automatic upshifting and downshifting in response to said speed signal between the corresponding selected hold ratio drive and any lower ratio drives of said plurality of ratio drives to provide optimum drive of said output with said input in said drive speed range, operative in each of the selected working ratio positions to provide the corresponding selected working ratio drive throughout said drive speed range to provide output speed in a constant ratio drive proportion to input speed and controllable by engine throttle control of input speed, and operative in each of said selected hold ratio drives and each of said selected working ratio drives to provide hold shifting between either the selected hold ratio drive or the selected working ratio drive and a higher ratio drive having an upshift at the maximum overrun output speed in the selected hold ratio drive and working ratio drive to prevent input speed exceeding maximum overrun speed and a downshift from the higher ratio drive at a lower output speed to provide input speed which is a hysteresis amount less than maximum overrun engine speed after said downshift.

3. In a transmission: variable ratio drive means having an input with a normal engine drive speed range and a higher engine maximum overrun speed and an output and continuously variable ratio drive means and gear means connected for drive between said input and output and said gear means providing a plurality of ratio drives having speed ratios continuously increasing in steps from a lowest ratio drive to a highest ratio drive, and said continuously variable ratio drive means providing continuously variable ratio drive in a ratio drive; governor means connected to said gear means and providing a speed signal varying with the speed of said output; control means operatively connected to said gear means and said governor means, having manual selector means having an automatic position to provide automatic upshifting and downshifting in response to said speed signal between said plurality of ratio drives, a hold ratio position corresponding to each of said plurality of ratio drives except for said highest ratio drive and a plurality of working ratio positions corresponding to each of said plurality of ratio drives and operative in each of said selected hold ratio positions to provide automatic upshifting and downshifting in response to said speed signal between the corresponding selected hold ratio drive and any lower ratio drives of said plurality of ratio drives to provide optimum drive of said output with said input in said drive speed range, operative in each of the selected working ratio positions to provide the corresponding selected working ratio drive throughout said drive speed range to provide output speed to input speed in the constant proportion of the selected ratio drive modified by the continuously variable ratio drive and controllable by engine throttle control of input speed, and operative in each of said selected hold ratio drives and each of said selected working ratio drives to provide hold shifting between either the selected hold ratio drive or the selected working ratio drive and a higher ratio drive having an upshift at the maximum overrun output speed in the selected hold ratio drive and working ratio drive to prevent input speed exceeding maximum overrun speed and a downshift from the higher ratio drive at a lower output speed to provide input speed which is a hysteresis amount less than maximum overrun engine speed after said downshift.

4. In a transmission: gear means having an input with a normal engine drive speed range and a higher engine maximum overrun speed and an output and providing low and high ratio drives having increasing speed ratios; clutch means having a vehicle drive and a works drive respectively selectively connecting said output for vehicle drive and for works drive; governor means operatively connected to said output and providing a speed signal varying with the speed of said output; torque demand means providing a torque demand signal varying with torque demand; manual selector means having an automatic and a hold position operative in a roading phase when said vehicle drive is selected for respectively providing an automatic signal and a low hold signal and operative in a working phase when said working drive is selected to additionally provide respectively high and low working ratio signals; automatic shift control means operatively connected to said gear means, said governor means, said torque demand means and said manual selector means and operative in response to said automatic signal to provide an automatic upshift from low to high ratio drive with increasing output speed at automatic upshift speeds increasing with increasing torque demand and an automatic downshift with decreasing output speed at a lower automatic downshift speed, operative in response to said low hold signal to provide said low ratio drive and a hold upshift and a hold downshift between said low ratio drive and high ratio drive at a higher output speed than said automatic shifts to prevent input speed exceeding said maximum overrun speed, operative in response to said automatic signal and high working signal to provide high ratio drive at all speeds, and in response to said low hold signal and low working signal to provide said hold upshift and hold downshift between said low ratio and said high ratio drive at said higher output speeds and said low ratio drive at all lower speeds.

5. In a transmission: gear means having an input with a normal engine drive speed range and a higher maximum overrun speed and an output and providing low, intermediate, and high ratio drives having increasing speed ratios; clutch means having a vehicle drive and a works drive respectively selectively connecting said output for vehicle drive and for works drive; governor means operatively connected to said output and providing a speed signal varying with the speed of said output; torque demand means providing a torque demand signal varying with torque demand; manual selector means having low, intermediate, and high positions operative in a roading phase when said vehicle drive is selected for selectively providing an automatic signal in said high position and low and intermediate hold signals respectively in said low and intermediate positions and operative in a working phase when said works drive is selected to additionally provide low, intermediate, and high working signals; automatic shift control means operatively connected to said gear means, said governor means, said torque demand means, and said manual selector means and selectively biased to upshift by an upshift bias force having the higher upshift bias force of the bias force controlled by said speed signal and the selected one of said low, intermediate, and high working signals and selectively biased to downshift by a downshift bias force controlled by said torque demand signal and the selected one of said low and intermediate hold signals and operative in response to said automatic signal to provide automatic upshifts controlled by said upshift bias force controlled by said speed signal and said downshift bias force controlled by said torque demand signal from low to intermediate to high ratio drives with increasing output speed at higher automatic shift output speeds which are higher with increasing torque demand and automatic downshifts at lower automatic downshift output speeds, operative in response to said intermediae hold signal to provide said automatic upshifts and downshifts between low and intermediate ratio drives and a hold upshift and downshift controlled by said upshift bias force controlled by said speed signal and a downshift bias force controlled by said intermediate hold signal between said intermediate and high ratio drives at hold shift output speeds higher than the same automatic shift output speeds to prevent input speed exceeding a maximum overrun speed, operative in response to said low hold signal to provide a hold upshift and downshift controlled by said upshift bias force controlled by said speed signal and a downshift bias force controlled by said low hold signal between said low and intermediate ratio drives at hold shift output speeds higher than the same automatic shift output speeds to prevent input speed exceeding a maximum overrun speed and said intermediate to high hold upshift and downshift, operative in response to said automatic signal and high working signal to provide said upshift bias force controlled by the higher upshift bias force of said speed signal and said high working signal and a downshift bias force controlled by said torque demand signal to provide high ratio drive at all output speeds, operative in response to said intermediate hold signal and intermediate working signal providing said upshift bias force controlled by the higher upshift bias force of said speed signal and said intermediate working signal and said downshift bias force controlled by said intermediate hold signal to provide said intermediate to high hold upshift and downshift and intermediate ratio drive at all lower output speeds and in response to said low hold signal and low working signal providing said upshift bias force controlled by the higher upshift bias force of said speed signal and said low working signal and said downshift bias force controlled by said low hold signal to provide said low to intermediate hold upshift and downshift, and low ratio drive at all lower output speeds.

6. In a transmission: gear means having an input with a normal engine drive speed range and a higher maximum overrun speed for drive by an engine and an output and providing low, intermediate, and high ratio drives having increasing speed ratios; clutch means having a vehicle drive and a works drive respectively selectively connecting said output for vehicle drive and for works drive; governor means operatively connected to said output and providing a speed pressure increasing with the speed of said output; torque demand means providing a torque demand pressure varying with torque demand from idle to full torque demand; manual selector means having low, intermediate, and high positions in both a roading and a working phase operative in a roading phase when said vehicle drive is selected for selectively providing an automatic signal in said high position and low and intermediate hold pressures respectively in said low and intermediate positions and operative in a working phase when said works drive is selected to additionally provide low, intermediate, and high working ratio pressures; automatic shift control means operatively connected to said gear means, said governor means, said torque demand means and said manual selector means and selectively biased to upshift by the higher of said speed pressures and the selected one of said low, intermediate, and high working ratio pressures and selectively biased to downshift by the selected one of said torque demand pressure and said low and intermediate hold pressures for first and second upshifts and downshifts, respectively between low and intermediate ratios and between intermediate and high ratios, and operative in response to said automatic signal to provide first and second automatic upshifts controlled by said speed pressure respectively in a low and high automatic upshift speed pressure range with speed pressure in each range increasing from a minimum to a maximum as said torque demand pressure varies from idle to full providing a maximum upshift speed pressure for said second upshift greater than for said first upshift and automatic first and second downshifts at lower automatic downshift speed pressures for automatic shifting with the input in the normal speed range, operative in response to said intermediate hold signal to provide said first automatic upshift and downshift and a second hold upshift and downshift controlled by said intermediate hold pressure at a second hold upshift speed pressure greater than said second maximum automatic upshift speed pressure and a second hold downshift at a second hold downshift speed pressure slightly lower than said second hold upshift speed pressure to prevent input speed exceeding said maximum overrun speed, operative in response to said low hold signal to provide a first hold upshift controlled by said low hold signal at a first hold upshift speed pressure higher than said first automatic upshift speed pressure and a first hold downshift at a lower first hold downshift speed pressure and said second hold upshift and downshift to prevent input speed exceeding said maximum overrun speed, operative in response to said automatic signal and the higher of said high working ratio pressure, which is greater than said second maximum automatic upshift speed pressure, and said speed pressure and said torque demand pressure to provide high ratio drive at all output speeds, operative in response to said intermediate hold pressure and the higher of said intermediate working ratio pressure, which is greater than said first maximum automatic upshift speed pressure and less than said second hold upshift speed pressure, and said speed pressure and said downshift bias force controlled by said torque demand pressure for said first shift and by said intermediate hold signal for said second shift to provide said second hold upshift and downshift and intermediate ratio drive at all lower output speeds, and operative in response to said low hold signal and the higher of said low working ratio pressure, which is greater than said first automatic upshift speed pressure and said speed pressure and said low hold pressure to provide said first and second hold upshifts and downshifts and low ratio drive at all lower speeds.

7. The invention defined in claim 6 and said low, intermediate and high working signals each providing an upshift bias force greater than the upshift bias force by said speed signal at said automatic upshift from the next lower ratio drive to each ratio drive and less than the upshift bias force by said speed signal at said hold downshift from the next higher ratio drive to each ratio drive.

* * * * *

UNITED STATES PATENT AND TRADEMARK OFFICE
CERTIFICATE OF CORRECTION

PATENT NO. : 4,111,072

DATED : September 5, 1978

INVENTOR(S) : Kenneth B. Harmon, Richard J. Koenig, and Carl A. Lentz

It is certified that error appears in the above-identified patent and that said Letters Patent are hereby corrected as shown below:

Column 11, line 7, "intermediae" should read -- intermediate --.
Column 11, line 24, "(4-3 inh)" should read -- (4-3 INH) --.
Column 11, line 55, "lurication" should read -- lubrication --.

Column 12, line 10, "working" should read -- roading --; and "[W]" should read -- [R] --.

Column 14, line 3, '161"' (2nd occur) should read -- 161' --.
Column 14, line 27, "hold" (2nd occur) should read -- HOLD --.

Column 16, line 5, "243" should read -- 244 --.
Column 16, line 44, after "N" insert -- , (a comma --.
Column 16, line 66, "inh" should read -- INH --.

Column 21, line 6, "shift" should read -- upshift --.

UNITED STATES PATENT AND TRADEMARK OFFICE
CERTIFICATE OF CORRECTION

PATENT NO. : 4,111,072
DATED : September 5, 1978
INVENTOR(S) : Kenneth B. Harmon, Richard J. Koenig, and Carl A. Lentz It is certified that error appears in the above-identified patent and that said Letters Patent are hereby corrected as shown below:

Column 4, line 24, delete "to" and insert therefor -- 89 and --.

Column 4, line 29, after "exhaust" insert -- 98 --.

Column 4, line 51, "mainlain" should read -- mainline --.

Column 6, line 10, after "rated" insert -- or maximum --.

Column 6, line 67, after "shift" insert -- signal --.

Column 7, line 26, after "189" insert -- seated --.

Column 8, line 33, "2-4" should read -- 3-4 --.

Column 9, line 53, "3Forward" should read -- 3rd Forward --.

Column 9, line 64, "to" should read -- so --.

Signed and Sealed this

Fifteenth Day of May 1979

[SEAL]

Attest:

RUTH C. MASON
Attesting Officer

DONALD W. BANNER
Commissioner of Patents and Trademarks